United States Patent
Pandit

(10) Patent No.: US 8,659,775 B2
(45) Date of Patent: Feb. 25, 2014

(54) PRINT SHOP MANAGEMENT METHOD FOR CUSTOMIZING PRINT-ON-DEMAND DRIVER

(75) Inventor: Rakesh Pandit, Irvine, CA (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 688 days.

(21) Appl. No.: 12/895,389

(22) Filed: Sep. 30, 2010

(65) Prior Publication Data

US 2012/0081737 A1 Apr. 5, 2012

(51) Int. Cl.
  *G06F 3/12* (2006.01)
  *G06K 15/00* (2006.01)

(52) U.S. Cl.
  USPC ......... 358/1.15; 358/1.1; 358/1.13; 358/1.14; 358/1.16; 358/1.17

(58) Field of Classification Search
  None
  See application file for complete search history.

(56) References Cited

U.S. PATENT DOCUMENTS

| | | | | |
|---|---|---|---|---|
| 6,975,415 | B2 * | 12/2005 | Yamade | 358/1.13 |
| 2003/0142337 | A1 * | 7/2003 | Kizaki et al. | 358/1.13 |
| 2005/0200879 | A1 * | 9/2005 | Nakagiri et al. | 358/1.13 |
| 2007/0296995 | A1 * | 12/2007 | Sakura | 358/1.13 |
| 2008/0024802 | A1 * | 1/2008 | Kato | 358/1.9 |
| 2008/0049258 | A1 * | 2/2008 | Moyo et al. | 358/3.28 |
| 2009/0109481 | A1 * | 4/2009 | Ozaki | 358/1.15 |
| 2010/0064208 | A1 * | 3/2010 | Valtchev | 715/234 |
| 2010/0118330 | A1 * | 5/2010 | Feijoo et al. | 358/1.15 |
| 2011/0032560 | A1 * | 2/2011 | Kizaki et al. | 358/1.13 |
| 2011/0063641 | A1 * | 3/2011 | Fukuda | 358/1.9 |

\* cited by examiner

*Primary Examiner* — Satwant Singh
(74) *Attorney, Agent, or Firm* — Chen Yoshimura LLP

(57) ABSTRACT

A method implemented in a print shop management system that includes a data processing apparatus having a non-transitory memory for storing a computer software program and a processor for executing the software program, wherein the program includes a program code configured to cause the data processing apparatus to execute a process for customizing a print-on-demand (POD) driver, which process includes the steps of accessing a configuration file of the POD driver having a plurality of fields with respective values; and modifying values of the configuration file fields to customize available user interfaces and print job settings editing options of the POD driver.

24 Claims, 8 Drawing Sheets

PRINT SHOP MANAGEMENT METHOD FOR CUSTOMIZING PRINT-ON-DEMAND DRIVER

BACKGROUND OF THE INVENTION

1. Field of the Invention

This invention relates to print job management system and method, and in particular, it relates to method implemented in print shops management systems for customizing print-on-demand driver and its graphical user interface.

2. Description of Related Art

In today's work environment where a large number of print jobs are processed with multiple printers, print shop management systems and programs are widely used to manage the print jobs and workflows effectively and efficiently. Examples of such a work environment are professional print shops and print/copy departments at large organizations, where a variety of print-on-demand (POD) requests, such as large-volume duplication and large document printing, needs to be processed and completed by utilizing multiple printers within a short turn-around time. These environments are collectively referred to as "print shops" in this application.

In a print shop management process, each printing job typically specifies a source file that electrically contains a document to be printed, and the required printing parameters such as the size, color and the type of the paper on which the document should be printed, the printing resolution, duplex or single-side printing, and certain finishing conditions, such as book, staple, collate printing, etc., depending on a print job requester's needs. In order to process a large volume of print jobs that each differ in terms of these job parameters, a print shop utilizes multiple commercial grade printers, including black & white and color printers, each with often different limitations on available printer settings, such as the paper size, the paper type, resolution settings, etc. In addition, the print shop employs various finishing devices, such as collators, staplers, hole punchers, folding machines, binding machines, etc.

A print shop (or print job) management process is typically implemented by software or firmware programs executed by digital data processing apparatus such as a control computer or server connected to the printers in a print shop. The print shop management system submits each print job to one or more printers and finishing devices to produce the print job. The job submission may be done automatically by the print shop management system, semi-automatically with certain amount of operator intervention, or manually where decisions of how to submit the print jot to appropriate printers or finishing devices are made by an operator.

Printer drivers are computer software programs that convert the data to be printed to the form specific to a printing device. For example, U.S. Pat. No. 6,975,415 B2 describes a printer with a data processing apparatus that uses a printer driver software to set print conditions. The general purpose of using printer drivers is to allow users to perform printing jobs without knowing the technical details of each printer model.

A printer driver often contains many data entries that can be set at different values reflecting available printing options offered by a printer. The program also typically provides a user interface (UI) for a user to set or modify the values of the data entries in the printer driver. However, in many print job applications a standard printer driver or its UI may be too complicated for users or print jobs that does not necessarily need to bothered with that many settings or do not need to edit or change many default settings. Therefore, there is a need for a system or server administrator to be able to modify or customize a printer driver installed on a server by deactivating certain selected settings that are not needed, or assigning default settings, for certain types of users or print jobs.

SUMMARY

The present invention is directed to a print shop management method for customizing a print-on-demand (POD) driver for certain types of users or print jobs so that a simpler version of the POD driver for such types of users or print jobs can be used, where unnecessary UIs or setting options for such types of users or print jobs are eliminated or skipped, thereby increasing the speed and efficiency in using the POD driver for processing print jobs.

An object of the present invention is to provide a method for a system administrator to install a default POD driver on a server, and then customize the POD driver by modifying or deactivating certain selected settings of the POD driver, or assigning other default settings, for certain types of users or print jobs, and then reinstall the modified POD driver on the server, so that it can be later duplicated and distributed to targeted users as needed.

Additional features and advantages of the invention will be set forth in the descriptions that follow and in part will be apparent from the description, or may be learned by practice of the present invention. The objectives and other advantages of the invention will be realized and attained by the structure particularly pointed out in the written description and claims thereof as well as the appended drawings.

To achieve these and/or other objects, as embodied and broadly described, the present invention provides a method implemented in a print shop management system for customizing a POD driver, including the steps of accessing a configuration file of the POD driver having a plurality of fields with respective values, and modifying values of the configuration file fields to customize available user interfaces (UIs) and print job settings editing options of the POD driver.

In another aspect, the present invention provides a print shop management system comprising a data processing apparatus having a non-transitory memory storing a computer software program and a processor executing the software program, wherein the program includes a program code configured to cause the data processing apparatus to execute a process for customizing a POD driver, which process includes the steps of accessing a configuration file of the POD driver having a plurality of fields with respective values, and modifying values of the configuration file fields to customize available user interfaces (UIs) and print job settings editing options of the POD driver.

In yet another aspect, the present invention provides a print shop management computer software program product having a computer readable program code embedded in a computer usable non-transitory storage medium for controlling a data processing apparatus, the computer readable program code configured to cause the data processing apparatus to execute a process for customizing a POD driver for one or more printing devices connected to the data processing apparatus, which process includes the steps of accessing a configuration file of the POD driver having a plurality of fields with respective values, and modifying values of the configuration file fields to customize available user interfaces (UIs) and print job settings editing options of the POD driver.

The POD driver is customizable in that its print parameter settings or values may be categorically activated or deactivate fully or partially. For example, the available UIs of the POD driver may include a print file selection UI which may be deactivated by modifying a corresponding print file selection field of the configuration file of the POD driver, a print driver selection UI which may be deactivated by modifying a corresponding print driver selection field of the configuration file of the POD driver, and a print job settings editing UI having categorized print job setting options, each may be deactivated by modifying a corresponding print job setting field of the configuration file of the POD driver.

The present invention process for customizing a POD driver may further include the step of retrieving an original version of the POD driver from a print server, saving a modified version of the POD driver to the print server, separately saving the original version of the POD driver and the modified version of the POD driver. As an intended result, multiple configuration files of the POD driver can be created, all of which are stored in the application and can be distributed and used, as required.

It is to be understood that both the foregoing general description and the following detailed description are exemplary and explanatory and are intended to provide further explanation of the invention as claimed.

DETAILED DESCRIPTION OF PREFERRED EMBODIMENTS

Embodiments of the present invention provide a method for customizing a print-on-demand (POD) driver. The present invention method may be implemented by a computer software program that has program codes and instructions for implementing the steps of the present invention.

Figure 1:
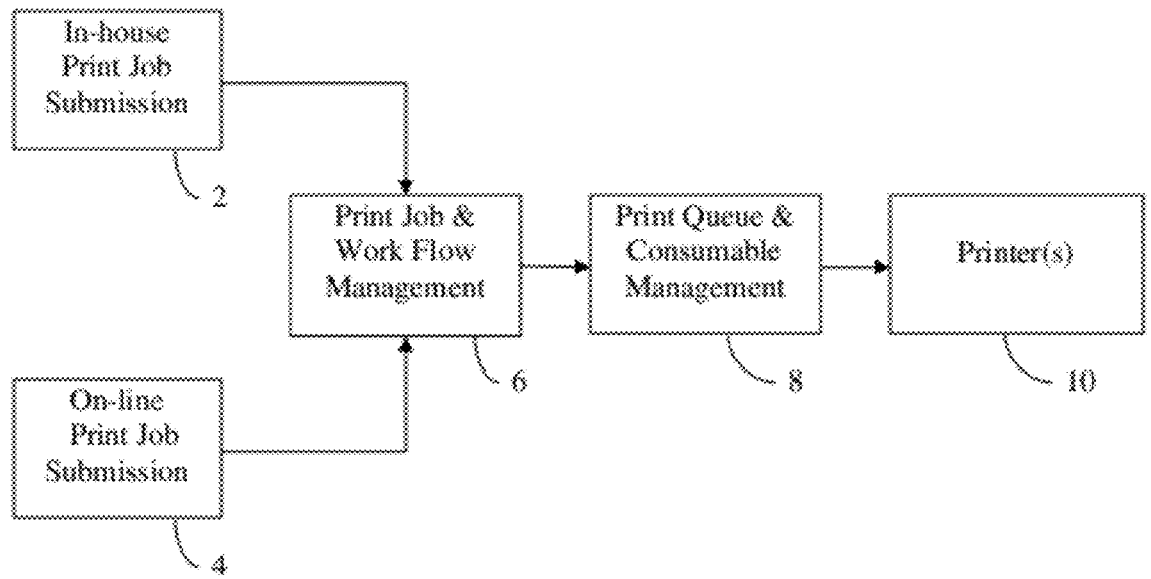
FIG. 1 is a functional block diagram schematically illustrating an exemplary print shop management system and method where embodiments of the present invention may be implemented.

Referring to FIG. 1, there is schematically illustrated the functional blocks of an exemplary application arrangement for a print shop management system and method implementing embodiments of the present invention.

The print shop management application arrangement includes an in-house print job submission portion 2, an on-line print job submission portion 4, a print job work flow management portion 6, a print queue and consumable management portion 8, and one or more printer(s) 10. The main functions of the print job work flow management portion include managing print job tickets, tracking print jobs, reporting print job status to the users/customers, maintaining efficient work flow, and managing user/customer accounts, etc. The main functions of the print queue and consumable management portion include providing user options for editing or modifying print jobs, searching for available printers, splitting print jobs (e.g. splitting duplex printing, splitting color and B/W printing, etc.), monitoring and controlling printer status, etc.

Figure 2:
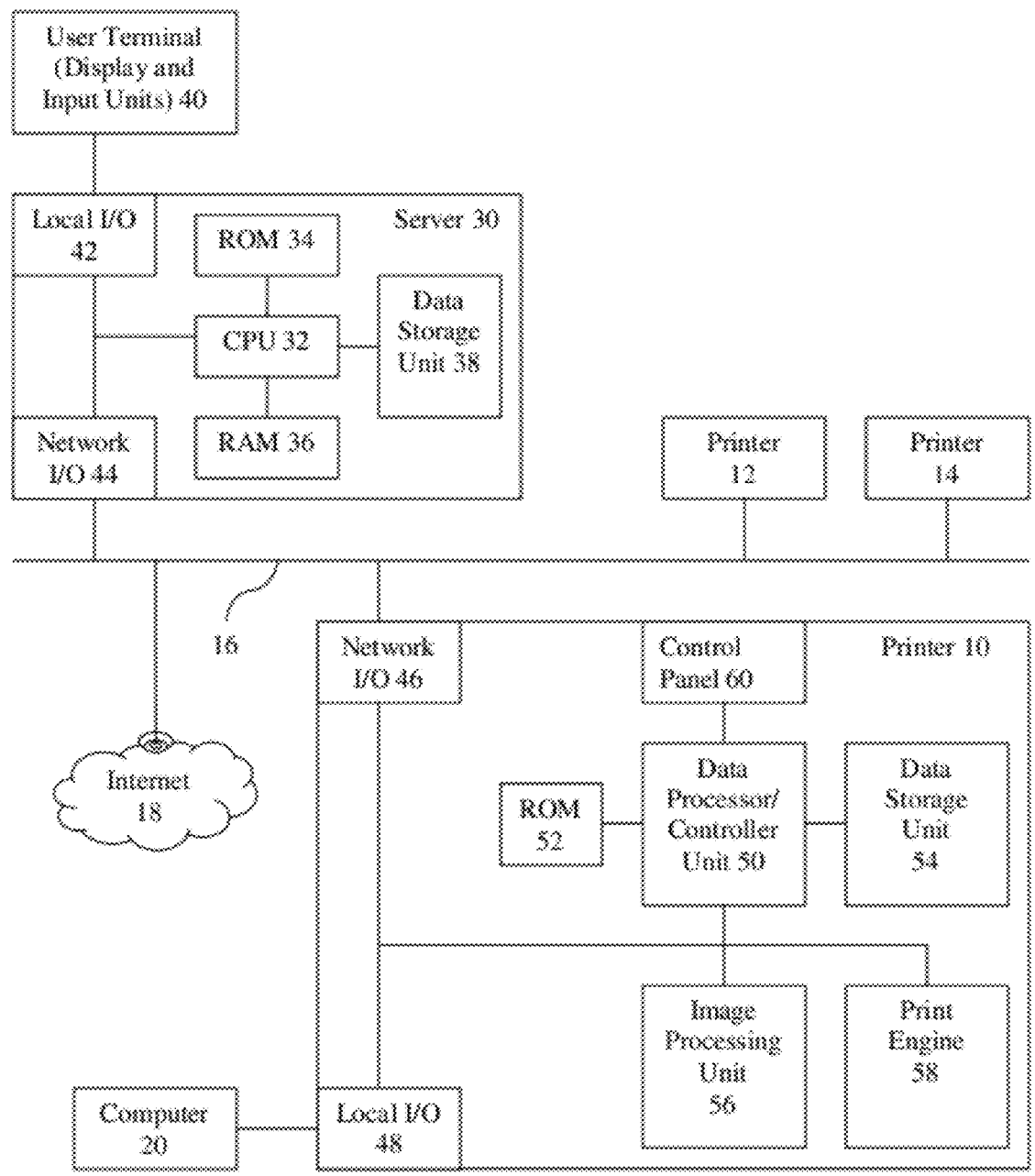
FIG. 2 schematically illustrates an exemplary print shop system having a plurality of printers connected to one or more computers and/or servers directly and/or via a network in which methods according to embodiments of the present invention may be implemented.

Referring to FIG. 2, there is schematically shown an exemplary print shop system for implementing the present invention. The print shop system include a plurality of color or B/W printers 10, 12, 14, ... connected to one or more computers 20 and/or servers 30 (or any suitable data processing apparatus) directly or remotely via a data communication channel 16 which may be a wired or wireless network, a dedicated cable or a serial bus connected to the printers. One or more user terminals 40 (each may have its display and input units) may be connected to the server 30 to enable print shop operators and/or users to interact with the server 30 and/or the rest of the print shop system. Alternatively the server may have its own integrated display and input units to enable print shop operators and/or users to interact with the server and/or the rest of the print shop system. The server 30 typically includes a central processor unit (CPU) 32 that controls the function and operation of the server 30 and execute computer instructions and programs that may be installed or saved on a read only memory (ROM) 34, a random access memory (RAM) 36, or a data storage unit 36 (such as a hard disc drive) coupled to the CPU 32.

The server typically also has a local input/output (I/O) port 42 for connection with the user terminal 44, and a network I/O port 44 for connection to the data communication channel 16. It is understood that the basic components of the computer 20 are similar to that of the server 30 and therefore will not be repeated in detail here. The server 30 is preferably also connected to an open external network 18 such as the Internet for remotely receiving on-line print jobs. The server 30 is remotely connected to the printer 10 via a network I/O port 46 of the printer 10, whereas the computer 20 may be directly connected to the printer 10 via a local I/O port 48 of the printer 12.

The basic components of the printers 10, 12 and 14 are also illustrated in printer 10, which include a data processor or controller unit 50 that controls the function and operation of the printer 10. The controller unit 50 of printer 10 is connected to a ROM (and/or a RAM) 52 and a data storage unit 54. The software program exemplarily implementing the present invention method and process may be installed on the computer 20 or server 30, but may also be installed on ROM (and/or RAM) 52 or data storage unit 54 (of the printer 10) which may include a non-transitory memory medium, and can be accessed and executed by the controller unit 50. The controller unit 50 is also coupled to and controlling an image processing unit 56 and a print engine 58 of the printer 10. A printer control panel 60 is provided on the printer 10. The control panel 60 is accessible by an operator or user and provides a user interface (UI) that may includes a display screen such as a liquid crystal display (LCD) display screen and user input devices such as keys, buttons, touch screen, etc., for an operator or user to communicate with the printer 10 and control the functions and operations of printer 10.

The exemplary print shop system shown in FIG. 2, in which embodiments of the present invention may be implemented, may also include other devices (not shown) connected to the computer 20, server 30 or network 16, such as scanners, etc. As mentioned above, remote users or customers may also be connected to the "on-line" server 30 or printer 10 via the Internet 18. In addition, the print shop system may also include a number of "off-line" (or "off-network") devices (not shown) that are not connected to the network 16, which devices may be any type of devices used in the print shop, such as finishing devices, prepress devices, etc.

The term "printer" used herein may be small desk-top printers typically seen in an office environment, or large printing systems used in print/copy departments at large organizations or professional print shops. It may also cover other similar image and document processing devices such as copiers or multifunction ("all-in-one") printers that also have copier, scanner and/or facsimile functions. As described above, the printer may be directly attached to a computer or server locally, or connected to a computer or server through a network remotely, where the computer or server are used to generate and send a print job to be processed by the printer through a printer driver which is a computer software program normally installed on the computer or server for converting the document or image to be printed to the form specific to the printer. The printer may have multiple paper trays to store paper of various sizes, color, and types. Further, the printer may be equipped with a sophisticated output sorting mechanism with multiple output trays to perform collate printing or other print finishing functions.

While FIG. 2 shows a print shop environment, the present invention is not limited to any physical setting of a shop or network, and can be applied to a print shop system having a distributed setting where printers at different locations are connected to a server. In particular, it should be apparent that one or more of the components of the print shop system can communicate with the rest of the system via virtual private network (VPN) or similar means through the Internet.

The print shop management software program, including the part for customized print job duplication functions that exemplarily implementing the present invention method and process, may be installed on the computer 20, the server 30 or the controller unit 50 of the printer 10, for managing a large number of print jobs that come into the print shop. As described earlier, the print job management software program organizes and manages print jobs using job tickets.

When a print shop operator executes the print job management software program, the computer 20 or server 30 carries out various functions of the software, including customized duplication of print jobs implementing the method of the prevent invention. The print job management software also utilizes useful features of a user interface (UI) and/or a graphical user interface (GUI) of the computer 20 or server 30 such as a touch-screen and/or a mouse and a keyboard, coupled or combined with a display monitor.

The print shop management software program that implements the present invention method may also be stored in the ROM (and/or RAM) 52 or data storage unit 54 of the printer 10 and executed by the controller unit 50 of the printer 10, utilizing the features and functions of the display panel 60 of the printer 10 for providing a UI and/or GUI to the operator or user of the printer 10.

In the context of this application, each of the devices in the print shop may be generally referred to as a "print job processing device" or "print job processing apparatus", and each of them performs some aspects of print job processing such as job intake, routing, editing, prepress, printing, finishing, etc. Various print job processing devices or apparatus are controlled by various print job management programs, which reside in memories and are executed by processors of the print job processing devices. Each print job management program has a print job database to store print jobs it processes. In this application, the terms "data processing apparatus" broadly refer to any computer, server, controller unit, and/or data processing apparatus that can implement various features of embodiments of the present invention described below with appropriate hardware/software.

In a preferred print shop management arrangement according to embodiments of the present invention, the server 30 is the under control of the print shop management software program, receives in-house or on-line print jobs from users or customers, process or generate print job tickets, and submits print job tickets and the documents or files to be printed (the "source documents" or "source files") to the one or more printers 10, 12, 14, etc.

Figure 3:
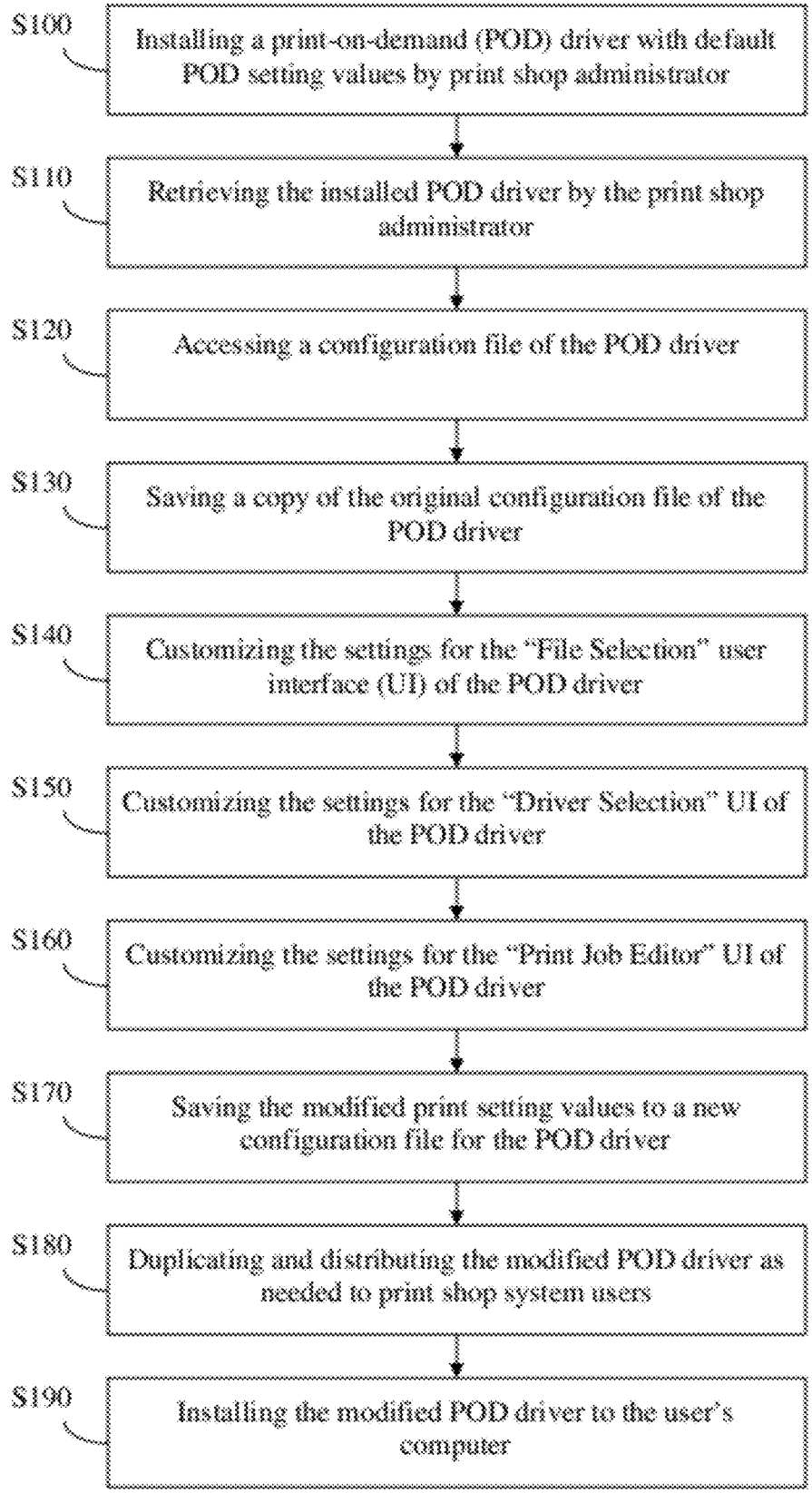
FIG. 3 is a flow chart illustrating a process for customizing a print-on-demand (POD) driver implemented by a program according to an embodiment of the present invention.

Referring to FIG. 3, there is illustrated an exemplary process implementing the method of the present invention for customizing a POD driver. The print shop system administrator first install on a server a POD driver with default print parameter settings or values (Step S110). To customize the POD driver, the system administrator locates and retrieves the POD driver (Step S120), and access and open its configuration file which may be a text file (i.e., a .txt file) that can be edited by using a text editor (Step S130). Before editing the values in the configuration file, an original version of the configuration file should be saved (Step S140), which may be retrieved later if the default values of the original configuration file needs to be restored. The print shop administrator then proceed to customize the settings for the "File Selection" UI of the POD driver (Step S140), customize the settings for the "Driver Selection" UI of the POD driver (Step S150), and customize the settings for the "Print Job Editor" UI of the POD driver (Step S160). The modified print setting values are saved to a new configuration file of the POD driver (Step S170). The modified POD driver can be later duplicated and distributed to as many users as needed (Step S180), which can be then installed on the user's computer (Step S190).

Figure 4:
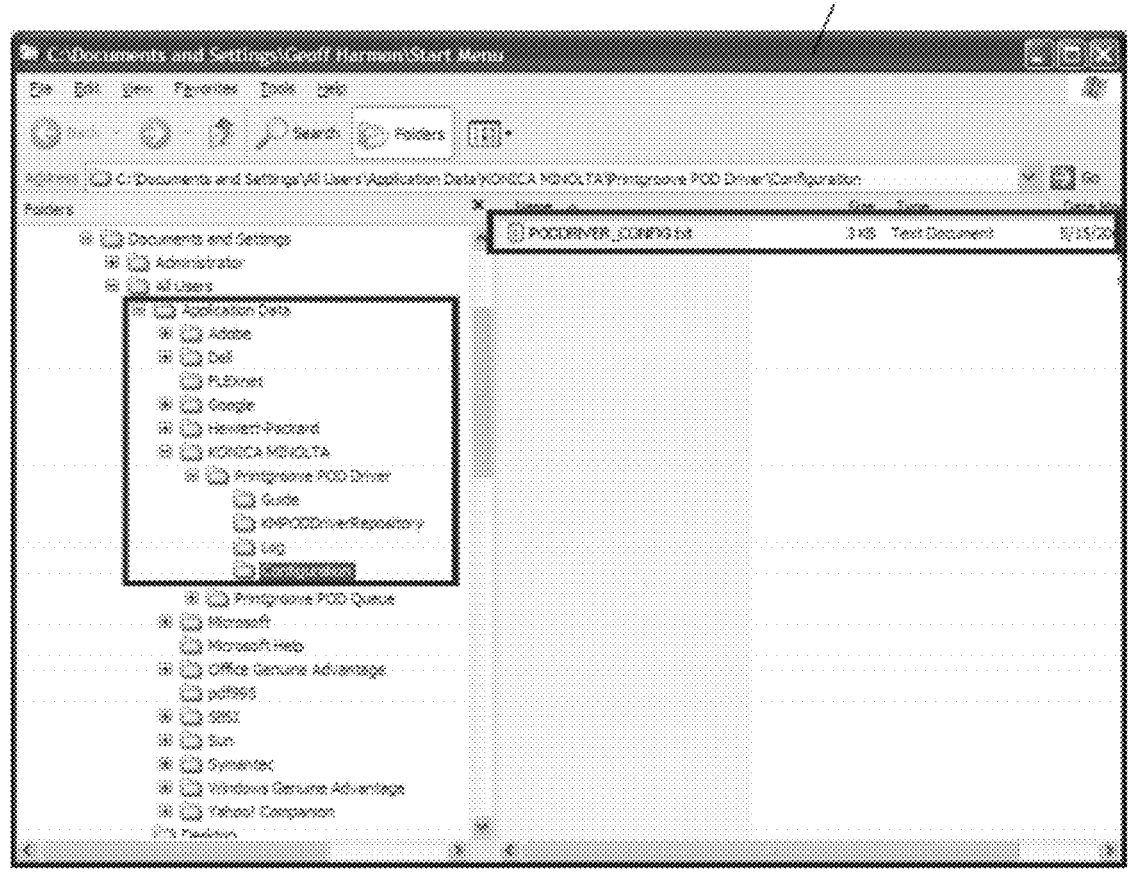
FIG. 4 shows an exemplary screenshot of a graphical user interface (GUI) displaying the location of the POD driver's configuration file.

Referring to FIG. 4, there is shown an exemplary screenshot 70 of a GUI displaying the location of the POD driver's configuration file. This is where the print shop administrator may locate and open the default driver's configuration file and modify it as many times as the print shop administrator would need in creating as many customized drivers.

Figure 5:
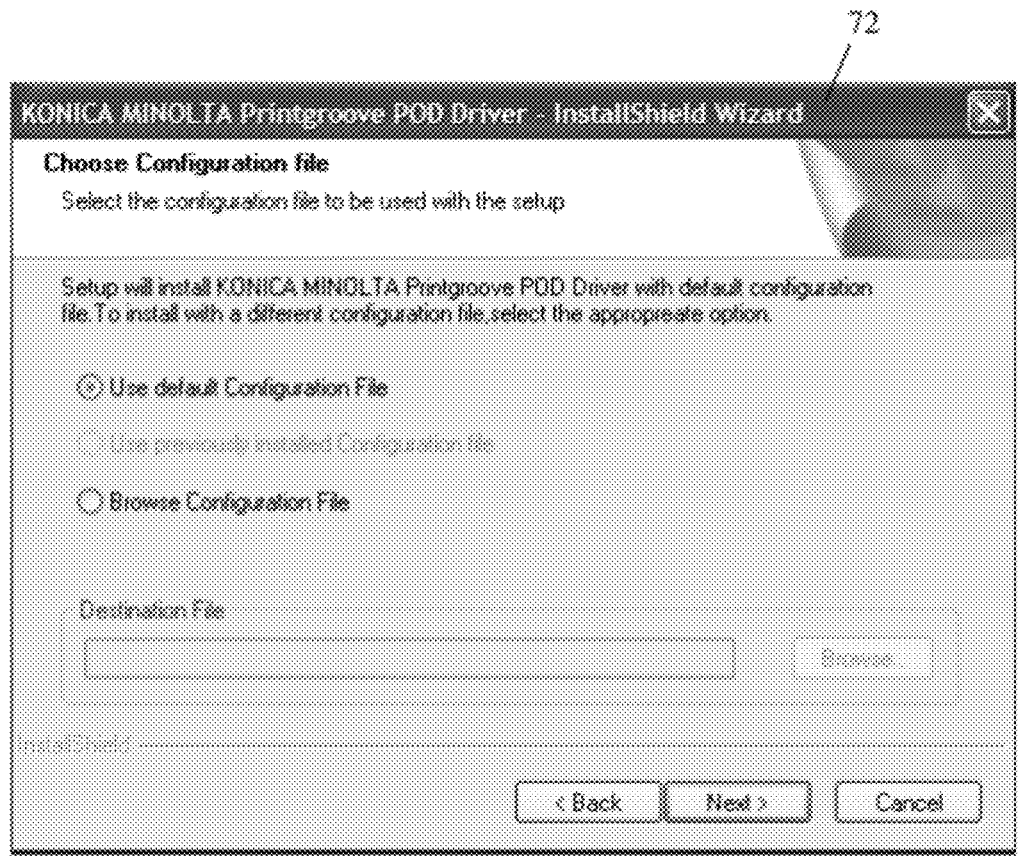
FIG. 5 shows an exemplary screenshot of a GUI of the POD driver install process.

Referring to FIG. 5, there is shown an exemplary screenshot 72 of a GUI of the POD driver install process. After the driver is installed, the user would select the "Browse Configuration File" button and navigate to the customized file created for their use. That customized file created file would then be installed for the user.

In an embodiment of the present invention, the POD driver is designed to function in the print shop system and arrangement as shown, for example, in FIGS. 1 and 2. For example, in addition to enable job ticket/printing settings generally, the POD driver may allow the users to combine multiple source files, modify their order with the end objective being to combine them into a single Portable Document Format (PDF) file. Moreover, the POD driver may specifically allow the users to select which POD modules the driver can communicate with and provides, for example, user name/password information to enable such connections when requested.

In a larger print shop environment, a complex variety of users may submit print jobs to the print workflow application or program. Some users may be skilled print shop operators and may understand the full complexity of all the settings. These users may be provided with a default driver (that has all the setting enabled). However, there may be some other users who are not familiar with using printer drivers or who for one reason or another should only be allowed to modify some most-commonly selected settings of a print job but not allowed to modify other complicated settings of the driver. In this case, the print shop administrator would need to create a driver configuration file that generates a restricted driver for limited use or purpose.

Figure 6:
FIG. 6 shows an exemplary screenshot of a "File Selection" graphical user interface (GUI) of a print-on-demand (POD) driver according to an embodiment of the present invention.
Figure 7:
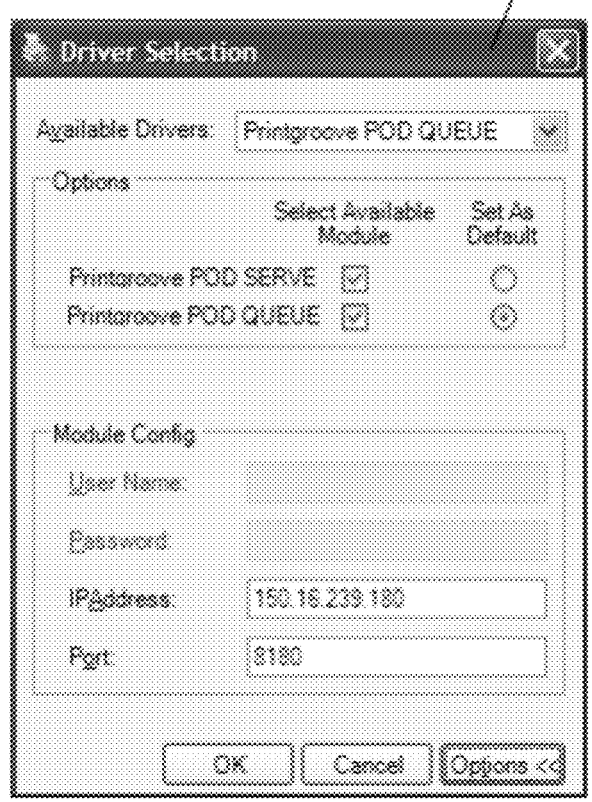
FIG. 7 shows an exemplary screenshot of a "Driver Selection" graphical user interface (GUI) of a print-on-demand (POD) driver according to an embodiment of the present invention.

For example, such limitations my include: (in reference to FIG. 6) keeping the UI screen active (since it is the only way a user can attach a file for PDF conversion, which is why the user needs to use the driver); (in reference to FIG. 7) preselecting values so that the user cannot modify this data and simply moves to the next step, as the administrator may need to preselect values so that the print job is sent to the desired POD system module (for example, at the desired IP Address using the correct port and user name/password) without the need for the user to enter or even know this information as it may be IT specific such that the user cannot modify anything; and (in reference to FIG. 8) disabling certain or all features but, for example, Copy count, so that the only thing a user submitting a job can do is to select the files and the number of copies they want to print.

The implement of such restriction or limitations allows the print shop the flexibility to create multiple drivers that may be given to users of various skills or knowledge levels and with which they may then add native files, convert them to PDF and submit them to the print shop workflow management application or program for printing/processing. The restrictions applied by customizing the POD driver provide in a sense a fail-safe solution that gives each user a driver commensurate with their skills or knowledge levels and can prevent unnecessary or unwanted mishaps or mistakes from further complicating the processing of a print job.

The present invention process for customizing the POD driver may be illustrated in three main UI screens: a File Selection screen (e.g., FIG. 6), a Driver Selection screen (e.g., FIG. 7), and a Print Job Editor screen (e.g., FIG. 8), that display the values or settings of the driver in an organized fashion. The system administrator may customize the POD driver by modifying the UI and settings or options of these screens.

Referring to FIGS. 3 and 6-8 in conjunction, the "File Selection" screen 74 (FIG. 6) is the first screen a user will see when submitting a native file using the driver. This step does not select a file for submitting to print. Rather one or more native files are combined together and then converted to a PDF file, as it is one of the preferred function of the present invention POD driver which gives the users a means to create PDF files if they do not have a program or utility to do so, providing a cost-saving alternative to expense PDF software programs.

However, when a user submits a file or document to be printed in PDF format by using, for example, a POD PDF submission tool, then this step may be skipped. Therefore the system administrator may customize the POD driver so that this screen is not displayed to such user.

In the POD driver's configuration file, the system administrator may modify the values of certain fields (or "keys") which identify the functions they control respectively.

Table 1 below lists the key(s) in the configuration file for customizing the "File Selection" screen. For example, in Table 1 the key in the configuration file of the POD driver for displaying the "File Selection" screen is "uiFileSelectionDlg" and its supported values are "ON" or "OFF". If "OFF" is selected, then the "File Selection" screen will not be displayed to the user.

TABLE 1

FILE SELECTION SCREEN

| Key | Supported Value | Default | Note |
| --- | --- | --- | --- |
| uiFileSelectionDlg | ON/OFF | ON | If OFF is selected, this screen will not be displayed to the user. |

The "Driver Selection" screen 76 (FIG. 7) is the next screen a user sees when submitting a file using the POD driver (or a PDF submission tool). The system administrator may customize the POD driver so that this screen is not displayed to the user. However, if this screen is to be displayed, the system administrator may customize some of the display fields by modifying the value of the respective keys. Table 2 below lists the keys in the configuration file of the POD drive for customizing the "Driver Selection" screen.

TABLE 2

DRIVER SELECTION SCREEN

| Key | Supported Value | Default | Note |
| --- | --- | --- | --- |
| uiSelectionPanel | ON/OFF | ON | If OFF is selected, this screen will not display to the user. If OFF is selected, a value MUST be entered in the IP Address key. If the Default values for Username, Password and PortNumber are incorrect, values must also be entered in these fields. |
| uiSelectionPanel -> fvServe | ON/OFF | ON | If OFF is selected, the Serve option is NOT displayed. |
| uiSelectionPanel -> fvQueue | ON/OFF | ON | If OFF is selected, the Queue option is NOT displayed. |
| uiSelectionPanel -> fvdefault | Serve/Queue | Queue | The value is automatically displayed in the Available Drivers drop-down selection field. |
| uiSelectionPanel -> fvUsername | Text | Blank | |

TABLE 2-continued

DRIVER SELECTION SCREEN

| Key | Supported Value | Default | Note |
|---|---|---|---|
| uiSelectionPanel -> fvPassword | Text | Blank | |
| uiSelectionPanel -> fvIPAddress | IP Address or DomainName | Blank | |
| uiSelectionPanel -> fvPortNumber | Number | 8180 for Queue, 443 for Serve | |

The "Print Job Editor" screen 78 (FIG. 8) is the final screen a user sees when submitting a file using the driver or the PDF submission tool. The driver may be customized so that this screen is not displayed to the user. However, if this screen is to be displayed, the administrator may customize some of the display fields by modifying the value of respective keys. Table 3 below lists the keys in the configuration file of the POD driver for customizing this screen.

TABLE 3

PRINT JOB EDITOR SCREEN

| Key | Supported Value | Default | Note |
|---|---|---|---|
| uiPJEPanel | ON/OFF | ON | If OFF is selected, this screen will not be displayed to the user, and the job will be sent automatically to Serve or Queue, where the target application's default job ticket settings are applied. |
| uiPJEPanel -> uiJobSettingPanel | ON/OFF | ON | If OFF is selected, the Job Settings option is NOT displayed. |
| uiPJEPanel -> uiBasicSettingPanel | ON/OFF | ON | If OFF is selected, the Basic Settings option is NOT displayed. |
| uiPJEPanel -> uiLayoutSettingPanel | ON/OFF | ON | If OFF is selected, the Layout Settings option is NOT displayed. |
| uiPJEPanel -> uiCoverSheetSettingPanel | ON/OFF | ON | If OFF is selected, the Cover Sheet Settings option is NOT displayed. |
| uiPJEPanel -> uiFinishingSettingPanel | ON/OFF | ON | If OFF is selected, the Finishing Settings option is NOT displayed. |
| uiPJEPanel -> uiInterSheetSettingPanel | ON/OFF | ON | If OFF is selected, the Inter-Sheet Settings option is NOT displayed. |
| uiPJEPanel -> uiImageQualitySettingPanel | ON/OFF | ON | If OFF is selected, the Image Quality Settings option is NOT displayed. |
| uiPJEPanel -> uiCustomerInfoPanel | ON/OFF | ON | If OFF is selected, the Customer Information option is NOT displayed. |

Figure 8:
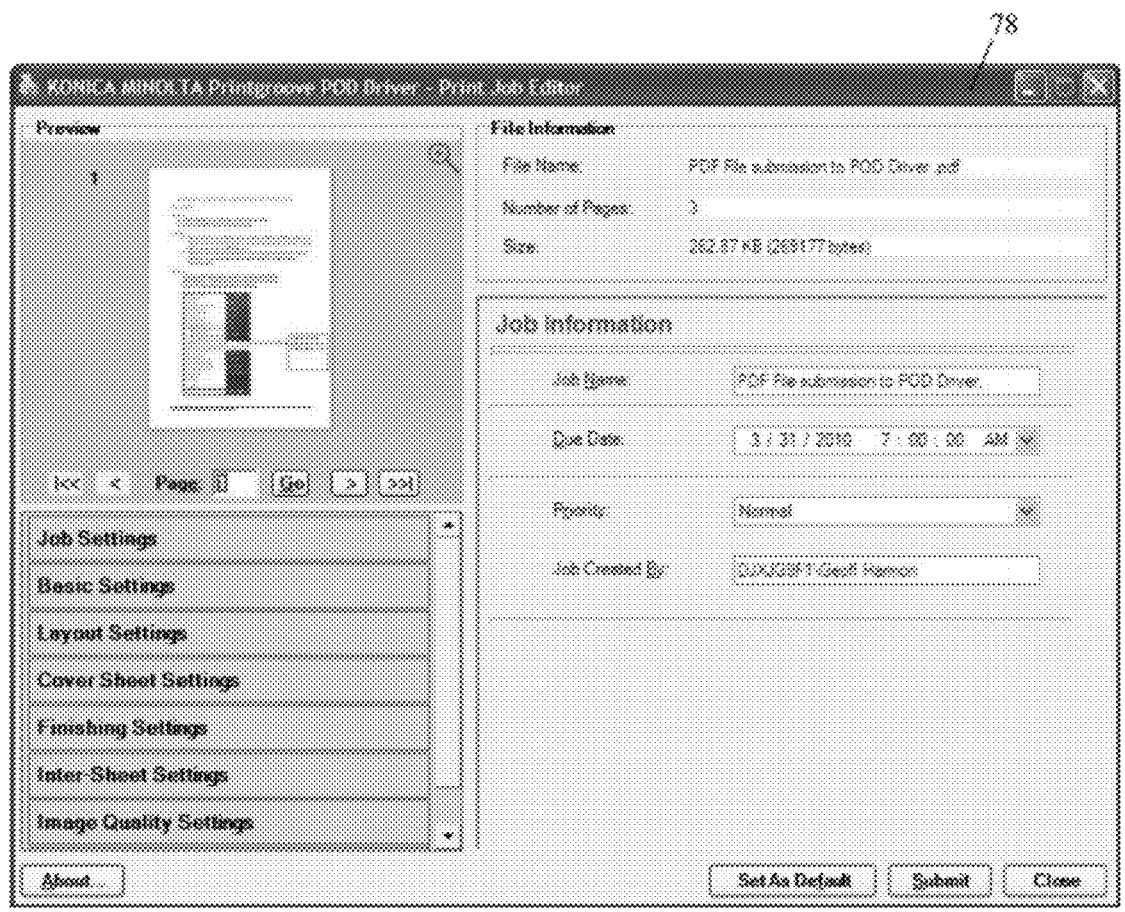
FIG. 8 shows an exemplary screenshot of a "Print Job Editor" graphical user interface (GUI) of a print-on-demand (POD) driver according to an embodiment of the present invention.

As shown in the UI in FIG. 8, multiple POD driver settings may be provided for user modification, including for example "Job" settings, "Basic" settings, "Layout" settings, "Cover Sheet" settings, "Inter-Sheet" settings, "Image Quality" settings, and "Finishing" settings, etc. However, the system administrator may customize the POD driver to display or not to display some of these setting options, as shown in Tables 4 through 10 below.

TABLE 4

PRINT JOB EDITOR SCREEN - JOB SETTINGS SCREEN OPTIONS

| Key | Supported Value | Default | Note |
|---|---|---|---|
| uiJobSettingPanel -> fvJobName | text value | Name of the first PDF file attached to the job | |

TABLE 4-continued

PRINT JOB EDITOR SCREEN - JOB SETTINGS SCREEN OPTIONS

| Key | Supported Value | Default | Note |
| --- | --- | --- | --- |
| uiJobSettingPanel –> fvDueDate | Numeric value = the number of days past the current date OR "Default" | 7 days from Submission date | |
| uiJobSettingPanel –> fvPriority | ON/OFF | Default value of the target application. | If OFF is selected, the option is grayed out. |
| uiJobSettingPanel –> fvJobCreator | text value or "Default" | Current user's name (OS login name) | |
| uiJobSettingPanel –> fvColorIntent | B&W, Color or Mixed | Default value of the target application. | |
| uiJobSettingPanel –> fvHighChroma | ON/OFF | OFF | If OFF is selected, the option is grayed out. |
| uiJobSettingPanel –> fvNotes | text value | | |

TABLE 5

PRINT JOB EDITOR SCREEN - BASIC SETTINGS SCREEN OPTIONS

| Key | Supported Value | Default | Note |
| --- | --- | --- | --- |
| uiBasicSettingPanel –> fvCopies | numeric value | 1 | |
| uiBasicSettingPanel –> fvCollate | ON/OFF | ON | If OFF is selected, the option is grayed out. |
| uiBasicSettingPanel –> fvOffset | ON/OFF | Default value of the target application. | If OFF is selected, the option is grayed out. |
| uiBasicSettingPanel –> fvPaperSettings | ON/OFF | Default value of the target application. | If OFF is selected, the option is grayed out. |

TABLE 6

PRINT JOB EDITOR SCREEN - LAYOUT SETTINGS SCREEN OPTIONS

| Key | Supported Value | Default | Note |
| --- | --- | --- | --- |
| uiLayoutSettingPanel –> fv2in1 | ON/OFF | Default value of the target application. | If OFF is selected, the option is grayed out. |
| uiLayoutSettingPanel –> fvPrinterType | ON/OFF | Default value of the target application. | If OFF is selected, the option is grayed out. |

TABLE 7

PRINT JOB EDITOR SCREEN - COVER SHEET SETTINGS SCREEN OPTIONS

| Key | Supported Value | Default | Note |
|---|---|---|---|
| uiCoverSheetSettingPanel –> fvFrontCover | ON/OFF | Default value of the target application. | If OFF is selected, the option is grayed out. |
| uiCoverSheetSettingPanel –> fvBackCover | ON/OFF | Default value of the target application. | If OFF is selected, the option is grayed out. |
| uiCoverSheetSettingPanel –> fvFrontCoverType | Printer/ Blank | Blank | |
| uiCoverSheetSettingPanel –> fvBackCoverType | Printer/ Blank | Blank | |

TABLE 8

PRINT JOB EDITOR SCREEN - INTER-SHEET SETTINGS SCREEN OPTIONS

| Key | Supported Value | Default | Note |
|---|---|---|---|
| uiInterSheetSettingPanel –> fvChapter | ON/OFF | ON | If OFF is selected, the option is grayed out. |
| uiInterSheetSettingPanel –> fvPerPageSettings | ON/OFF | ON | If OFF is selected, the option is grayed out. |

TABLE 9

PRINT JOB EDITOR SCREEN - IMAGE QUALITY SETTINGS SCREEN OPTIONS

| Key | Supported Value | Default | Note |
|---|---|---|---|
| uiImageQualitySettingPanel –> fvResolution | 600 DPI/ 1200 DPI | 600 DPI | |

TABLE 10

PRINT JOB EDITOR SCREEN - FINISHING SETTINGS SCREEN OPTIONS

| Key | Supported Value | Default | Note |
|---|---|---|---|
| uiFinishingSettingPanel –> fvBinding | ON/OFF | Default value of the target application. | If OFF is selected, the option is grayed out. |
| uiFinishingSettingPanel –> fvSaddleStitch | ON/OFF | Default value of the target application. | If OFF is selected, the option is grayed out. |
| uiFinishingSettingPanel –> fvTrim | ON/OFF | Default value of the target application. | If OFF is selected, the option is grayed out. |
| uiFinishingSettingPanel –> fvStaple | ON/OFF | Default value of the target application. | If OFF is selected, the option is grayed out. |
| uiFinishingSettingPanel –> fvPunch | ON/OFF | Default value of the target application. | If OFF is selected, the option is grayed out. |
| uiFinishingSettingPanel –> fvFolding | ON/OFF | Default value of the target application. | If OFF is selected, the option is grayed out. |

TABLE 10-continued

PRINT JOB EDITOR SCREEN - FINISHING SETTINGS SCREEN OPTIONS

| Key | Supported Value | Default | Note |
| --- | --- | --- | --- |
| uiFinishingSettingPanel –> fvAdhesiveBind | ON/OFF | Default value of the target application. | If OFF is selected, the option is grayed out. |
| uiFinishingSettingPanel –> fvPerfectBind | ON/OFF | Default value of the target application. | If OFF is selected, the option is grayed out. |
| uiFinishingSettingPanel –> fvPerfectBind | ON/OFF | Default value of the target application. | If OFF is selected, the option is grayed out. |

After the administrator completes the modification of all field or "key" values in the configuration file of the POD driver, a new configuration file can be saved (FIG. 3, Step 170), which is preferably stored in a different location than that of the original configuration file. If there is a situation in which the customized configuration file is unavailable or accidentally over-written, the original configuration can always be restored.

As mentioned earlier, when needed, the modified POD driver can be duplicated and distributed to print shop system users (FIG. 3, Step S180). A user can then install the modified POD driver on the user's computer (FIG. 3, Step S190). The POD driver is installed locally on the user or customer's computer, providing both the ".exe" file and the "config.txt" file. The user runs the execution file and when prompted uses the on-screen Browse button to navigate to the correct config.txt file to select it, and complete the driver install process. This ensures that the customized driver is installed on the user's local system. If the user has previously installed the original POD driver, the original version of the POD driver needs to be uninstalled and then reinstalled with the modified version. If no previous version of the driver has been installed, then this step will be a new installation of the modified POD driver.

The exemplary embodiments of the present invention method and process described herein may be implemented in a print job management software program, without requiring special proprietary hardware or firmware.

Although example(s) of the UI displays used in the process of the present invention are shown and described in detail here (e.g. FIGS. 6-8), the invention is not limited to the specifics of such UI display(s). The invention may be implemented using any forms of UI displays, as long as the UI display includes display means and input means that allow the user to specify various settings and issue commands to the programs. The input means may be buttons, check boxes, radio buttons, text input fields, drop-down menus, pop-up menus, icons, tabs for bringing up different sheets, separate windows, etc., or combinations thereof, or any other suitable structure of allowing the user to input information to the computer. The computer software designs for suitable structures of the input means are apparent and familiar to a person of ordinary skill in this field. Therefore, detailed descriptions for these structures are omitted from here. The term "user interface (or UI) display" is used to generally mean any suitable screen display that displays information to the user and/or allows the user to input commands and other information, and is not limited to any specific form of display, and may include a series of consecutive displays.

The methods for customizing a POD driver provided by embodiments of the present invention have many advantages. It allows an administrator to customize a POD driver for certain types of users or print jobs so that a simpler version of the POD driver for such types of users or print jobs can be used, where unnecessary UIs or setting options for such types of users or print jobs are eliminated or skipped, thereby increasing the speed and efficiency in using the POD driver for processing print jobs.

It will be apparent to those skilled in the art that various modification and variations can be made in the method and related apparatus of the present invention without departing from the spirit or scope of the invention. Thus, it is intended that the present invention cover modifications and variations that come within the scope of the appended claims and their equivalents.

What is claimed is:

1. A method implemented in a print shop management system for customizing a print-on-demand (POD) driver, comprising the steps of:
    (a) accessing a configuration file of the POD driver having a plurality of fields with respective values; and
    (b) modifying values of the configuration file fields to customize available user interfaces (UIs) of print job settings editing options of the POD driver by selectively activating or deactivating display of the available UIs to provide user editing options of print job settings for which display of their UIs is activated but to prohibit user editing options of print job settings for which display of their UIs is deactivated.

2. The method of claim 1, further comprising the step of installing the POD driver with default values for the plurality of fields on a print server.

3. The method of claim 1, further comprising the step of retrieving an original version of the POD driver from a print server.

4. The method of claim 3, further comprising the step of saving a modified version of the POD driver to the print server.

5. The method of claim 4, further comprising the step of separately saving the original version of the POD driver and the modified version of the POD driver.

6. The method of claim 1, wherein the available UIs of the POD driver comprises a print file selection UI which may be deactivated by modifying a corresponding print file selection field of the configuration file of the POD driver.

7. The method of claim 1, wherein the available UIs of the POD driver comprises a print driver selection UI which may be deactivated by modifying a corresponding print driver selection field of the configuration file of the POD driver.

8. The method of claim 1, wherein the available UIs of the POD driver comprises a print job settings editing UI having categorized print job setting options, each may be deactivated by modifying a corresponding print job setting field of the configuration file of the POD driver.

9. A print shop management system comprising a data processing apparatus having a non-transitory memory storing a computer software program and a processor executing the software program, wherein the program includes a program code configured to cause the data processing apparatus to execute a process for customizing a print-on-demand (POD) driver, which process comprises the steps of:
 (a) accessing a configuration file of the POD driver having a plurality of fields with respective values; and
 (b) modifying values of the configuration file fields to customize available user interfaces (UIs) of print job settings editing options of the POD driver by selectively activating or deactivating display of the available UIs to provide user editing options of print job settings for which display of their UIs is activated but to prohibit user editing options of print job settings for which display of their UIs is deactivated.

10. The system of claim 9, wherein the process further comprises the step of installing the POD driver with default values for the plurality of fields on a print server.

11. The system of claim 9, wherein the process further comprises the step of retrieving an original version of the POD driver from a print server.

12. The system of claim 11, wherein the process further comprises the step of saving a modified version of the POD driver to the print server.

13. The system of claim 12, wherein the process further comprises the step of separately saving the original version of the POD driver and the modified version of the POD driver.

14. The system of claim 12, wherein the available UIs of the POD driver comprises a print file selection UI which may be deactivated by modifying a corresponding print file selection field of the configuration file of the POD driver.

15. The method of claim 12, wherein the available UIs of the POD driver comprises a print driver selection UI which may be deactivated by modifying a corresponding print driver selection field of the configuration file of the POD driver.

16. The system of claim 12, wherein the available UIs of the POD driver comprises a print job settings editing UI having categorized print job setting options, each may be deactivated by modifying a corresponding print job setting field of the configuration file of the POD driver.

17. A print shop management computer software program product having a computer readable program code embedded in a computer usable non-transitory storage medium for controlling a data processing apparatus, the computer readable program code configured to cause the data processing apparatus to execute a process for customizing a print-on-demand (POD) driver, which process comprises the steps of:
 (a) accessing a configuration file of the POD driver having a plurality of fields with respective values; and
 (b) modifying values of the configuration file fields to customize available user interfaces (UIs) of print job settings editing options of the POD driver by selectively activating or deactivating display of the available UIs to provide user editing options of print job settings for which display of their UIs is activated but to prohibit user editing options of print job settings for which display of their UIs is deactivated.

18. The program of claim 17, wherein the process further comprises the step of installing the POD driver with default values for the plurality of fields on a print server.

19. The program of claim 17, wherein the process further comprises the step of retrieving an original version of the POD driver from a print server.

20. The program of claim 19, wherein the process further comprises the step of saving a modified version of the POD driver to the print server.

21. The program of claim 20, wherein the process further comprises the step of separately saving the original version of the POD driver and the modified version of the POD driver.

22. The program of claim 17, wherein the available UIs of the POD driver comprises a print file selection UI which may be deactivated by modifying a corresponding print file selection field of the configuration file of the POD driver.

23. The program of claim 17, wherein the available UIs of the POD driver comprises a print driver selection UI which may be deactivated by modifying a corresponding print driver selection field of the configuration file of the POD driver.

24. The program of claim 17, wherein the available UIs of the POD driver comprises a print job settings editing UI having categorized print job setting options, each may be deactivated by modifying a corresponding print job setting field of the configuration file of the POD driver.

* * * * *